US010862561B2

(12) United States Patent
Xu et al.

(10) Patent No.: US 10,862,561 B2
(45) Date of Patent: Dec. 8, 2020

(54) ELECTRONIC DEVICE AND METHOD FOR NETWORK CONTROL TERMINAL AND NETWORK NODE

(71) Applicant: Sony Corporation, Tokyo (JP)

(72) Inventors: Jin Xu, Beijing (CN); Chaonan He, Beijing (CN); Hang Yang, Beijing (CN); Siqi Liu, Beijing (CN); Cheng Gao, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 72 days.

(21) Appl. No.: 16/323,794

(22) PCT Filed: Nov. 3, 2017

(86) PCT No.: PCT/CN2017/109296
§ 371 (c)(1),
(2) Date: Feb. 7, 2019

(87) PCT Pub. No.: WO2018/095210
PCT Pub. Date: May 31, 2018

(65) Prior Publication Data
US 2019/0173555 A1 Jun. 6, 2019

(30) Foreign Application Priority Data

Nov. 24, 2016 (CN) .......................... 2016 1 1052958

(51) Int. Cl.
*H04B 7/024* (2017.01)
*H04B 7/06* (2006.01)
(Continued)

(52) U.S. Cl.
CPC ........... *H04B 7/0626* (2013.01); *H04B 7/024* (2013.01); *H04B 7/0617* (2013.01); *H04B 17/29* (2015.01);
(Continued)

(58) Field of Classification Search
CPC .... H04B 7/0626; H04B 7/024; H04B 7/0617; H04B 7/0413; H04B 17/29; H04B 17/327;
(Continued)

(56) References Cited

U.S. PATENT DOCUMENTS

2014/0016497 A1   1/2014  Seo et al.
2014/0204765 A1   7/2014  Chai et al.
(Continued)

FOREIGN PATENT DOCUMENTS

| CN | 103024751 A | 4/2013 |
| CN | 103597753 A | 2/2014 |
| CN | 105792277 A | 7/2016 |

OTHER PUBLICATIONS

International Search Report dated Dec. 28, 2017 for PCT/CN2017/109296 filed on Nov. 3, 2017, 10 pages including English Translation.

Primary Examiner — Kent Krueger
(74) Attorney, Agent, or Firm — Xsensus LLP

(57) ABSTRACT

Provided in the disclosure are an electronic device and method for a network control terminal, and an electronic device and method for a network node. The electronic device and method for a network control terminal comprise: a processing circuit configured to determine, based on first indication information from an adjacent network control terminal, that a network node served by the present network control terminal measures a channel state information reference signal (CSI RS) port of reference signal receiving power (RSRP) of same, wherein the first indication information indicates an interference state of the CSI RS port used by the corresponding adjacent network control terminal; and determine, based on a measurement result from the
(Continued)

network node, the adjacent network control terminal interfering with the network node, and the CSI RS port thereof.

12 Claims, 12 Drawing Sheets

(51) Int. Cl.
    *H04L 5/00*          (2006.01)
    *H04W 88/08*       (2009.01)
    *H04L 1/16*          (2006.01)
    *H04B 17/29*        (2015.01)
    *H04W 24/10*       (2009.01)
    *H04J 11/00*        (2006.01)
    *H04B 17/327*      (2015.01)
    *H04B 7/0413*      (2017.01)

(52) U.S. Cl.
    CPC ............ *H04B 17/327* (2015.01); *H04J 11/00* (2013.01); *H04L 1/1614* (2013.01); *H04L 5/0048* (2013.01); *H04W 24/10* (2013.01); *H04W 88/085* (2013.01); *H04B 7/0413* (2013.01)

(58) Field of Classification Search
    CPC ....... H04J 11/00; H04L 5/0048; H04W 24/10; H04W 88/085
    See application file for complete search history.

(56) References Cited

U.S. PATENT DOCUMENTS

2015/0351085 A1    12/2015   Lee et al.
2017/0006613 A1*   1/2017   Kakishima ............. H04B 7/024

* cited by examiner

US 10,862,561 B2

ELECTRONIC DEVICE AND METHOD FOR NETWORK CONTROL TERMINAL AND NETWORK NODE

CROSS-REFERENCE TO RELATED APPLICATIONS

The present application is based on PCT filing PCT/CN2017/109296, filed Nov. 3, 2017, and claims the priority of the Chinese Patent Application No. 201611052958.0, filed with the China National Intellectual Property Administration on Nov. 24, 2016, titled "ELECTRONIC DEVICE AND METHOD FOR NETWORK CONTROL TERMINAL AND NETWORK NODE", the contents of which are incorporated herein by reference in its entirety.

FIELD OF THE INVENTION

Embodiments of the present disclosure generally relate to the field of wireless communications, particularly to interference processing in wireless communications, and more particularly to an electronic apparatus and a method for a network control terminal and a network node.

BACKGROUND OF THE INVENTION

In the actual scenario of 3D-MIMO (Multiple Input Multiple Output), a channel in vertical dimension can be utilized, and a base station supports beam-forming in the vertical dimension. This can improve quality of service (QoS) for users distributed in a high-rise building. A traditional beam-forming in a horizontal dimension has a constant down tilt angle. Consequently, it is possible to cover an edge user in an adjacent cell, thereby causing inter-cell interferences. In the case of beam-forming in a vertical dimension, a vertical beam serving for a user in a high-rise building may have a great impact on an edge user in an adjacent cell due to the large down tilt angle.

FIG. 1 is a diagram illustrating one exemplary scenario in which such interferences occur. As shown in FIG. 1, in the case that the beam-forming channel status information reference signal (CSI RS) is K>1 Class B, a base station 2 (BS2) is configured with K CSI RSs which respectively point to different beam directions, including different vertical beam directions. However, a beam in a certain direction may cover a certain user in an adjacent cell. In this case, the beam may be considered to produce relatively strong interferences to the adjacent cell. For example, as shown in FIG. 1, the beam serving for User Equipment 2 (UE2) in a high-rise building produces interferences to UE1 in an adjacent cell, that is, a beam approaching the horizontal direction may produce severe inter-cell interferences. In addition, the beam serving for UE3 may also produce strong interferences to UE1 in an adjacent cell.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

An electronic apparatus and a method for a network control terminal according to one aspect of the present disclosure are provided. The electronic apparatus includes processing circuitry configured to determine, based on first indication information from an adjacent network control terminal, a channel status information reference signal (CSI RS) port of which reference signal receiving power (RSRP) is to be measured by a network node served by the present network control terminal, wherein, the first indication information indicates interference status of CSI RS ports used by the corresponding adjacent network control terminal; and determine, based on a measurement result of the network node, an adjacent network control terminal and a CSI RS port thereof producing interferences to the network node.

An electronic apparatus for a network control terminal is provided according to another aspect of the present disclosure. The electronic apparatus includes processing circuitry configured to acquire, from a network node served by the present network control terminal, a measurement result of RSRP by the network node with respect to CSI RS ports used by the present network control terminal and generate, based on the measurement result, first indication information indicating interference status of the CSI RS ports used by the present network control terminal.

An electronic apparatus for a network node is provided according to another aspect of the present disclosure. The electronic apparatus includes processing circuitry configured to evaluate quality of service of the network node; measure RSRP of CSI RS ports used by the network node, when the quality of service is lower than a predetermined level; and generate, based on a measurement result, information indicating interference status of the CSI RS ports.

A method for a network control terminal according to another aspect of the present disclosure is provided. The method for a network control terminal includes determining, based on first indication information from an adjacent network control terminal, a channel status information reference signal (CSI RS) port of which reference signal receiving power (RSRP) is to be measured by a network node served by the present network control terminal, wherein, the first indication information indicates interference status of CSI RS ports used by the corresponding adjacent network control terminal; and determining, based on a measurement result of the network node, an adjacent network control terminal and a CSI RS port thereof producing interferences to the network node.

A method for a network control terminal according to another aspect of the present disclosure is provided. The method for a network control terminal includes acquiring, from a network node served by the present network control terminal, a measurement result of RSRP by the network node with respect to CSI RS ports used by the present network control terminal; and generating, based on the measurement result, first indication information indicating interference status of the CSI RS ports used by the present network control terminal.

A method for a network node according to another aspect of the present disclosure is provided. The method for the network node includes evaluating quality of service of the network node; measuring RSRP of CSI RS ports used by the network node, when the quality of service is lower than a predetermined level; and generating, based on a measurement result, information indicating interference status of the CSI RS ports.

According to other aspects of the present disclosure, there are further provided computer program codes and computer program products for methods for the electronic apparatus as well as a computer-readable storage medium recording the computer program codes for implementing the methods.

With the electronic apparatus and method according to the embodiments of the present disclosure, whether significant interferences between the service areas of the adjacent network control terminals are produced can be determined by measuring the RSRP of the CSI RS ports and the beam producing interferences can be further determined, whereby measures can be taken to effectively reduce the impact of these interferences.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

As described above, strong interferences between cells may occur due to the application of beam-forming in a vertical dimension. In addition, in other cases, significant interferences between cells may also occur. More generally, even in the case where there is no concept of a cell, there may be interferences between service areas of network control terminals due to factors such as beam-forming. For example, a beam used by a certain network control terminal covers or partially covers a certain network node of an adjacent network control terminal, thereby producing serious interferences to the network node. Therefore, it is of significance to determine whether the interferences occur and to determine an interfering beam for improving communication quality and efficiency.

The network control terminal may refer to an entity in a communication system for implementing functions such as relevant setting, control, and communication resource allocation of communication activities, such as a base station and a small base station in a cellular communication system, a baseband cloud device under a C-RAN (Cloud-RAN/Centralized-RAN) architecture (there may be no concept of a cell), such as any BBU in the BBU pool that is in high speed communication with each other under the C-RAN architecture, or the like. The network node may refer to an entity in a communication system that uses communication resources to achieve its communication purposes, such as various user equipment (such as mobile terminals, smart vehicles, and smart wearable devices with a cellular communication capability) or network infrastructure such as a small cell base station.

Figure 2:
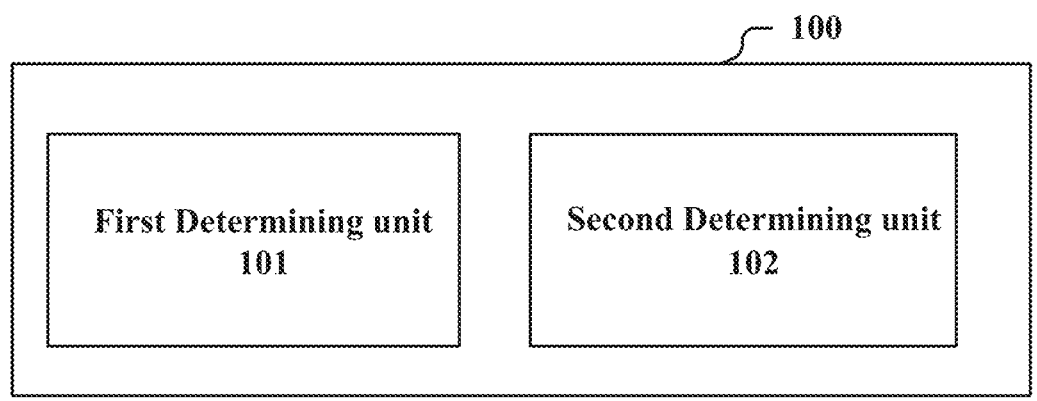
FIG. 2 is a block diagram illustrating functional modules of an electronic apparatus for a network control terminal according to an embodiment of the present disclosure.

FIG. 2 is a block diagram illustrating functional modules of an electronic apparatus 100 for a network control terminal according to an embodiment of the present disclosure. As shown in FIG. 2, the electronic apparatus 100 includes: a first determining unit 101, configured to determine, based on first indication information from an adjacent network control terminal, a CSI RS port of which reference signal receiving power (RSRP) is to be measured by a network node served by the present network control terminal, the first indication information indicating interference status of CSI RS ports used by the corresponding adjacent network control terminal; and a second determining unit 102, configured to determine, based on a measurement result from the network node, an adjacent network control terminal and a CSI RS port thereof producing interference to the network node.

Figure 1:
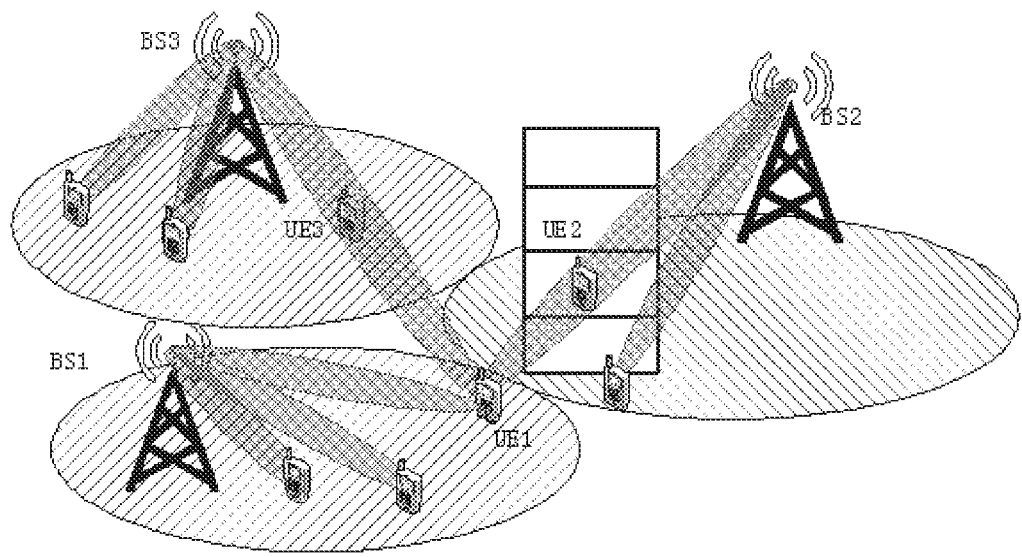
FIG. 1 is a diagram illustrating one exemplary scenario in which a beam-forming in a vertical dimension produces inter-cell interferences.

For example, when considered in conjunction with the scenario in FIG. 1, the electronic apparatus 100 may be arranged in a base station or communicatively connected with a base station, and the network node may be user equipment (UE). It should be noted that although the description may be made in combination with the scenario in FIG. 1 for ease of understanding in the specification, those skilled in the art should understand that the application scenario of the embodiments of the present disclosure is not limited thereto, but may be applied to any case where interferences between the service areas of the adjacent network control terminals occurs.

The first determining unit 101 and the second determining unit 102, for example, may be implemented by one or more processing circuitries which may be implemented as for example a chip.

The network node may acquire knowledge of a receiving power level of a CSI RS port, by measuring the RSRP of the corresponding CSI RS port. For example, for the CSI RS ports used by the present network node (and the present network control terminal), the emitting power of the CSI RS ports is not 0, and these ports are non-zero power (NZP) CSI RS ports. Under normal circumstances, the RSRP of such CSI RS ports should be high. On the contrary, for the CSI RS ports not used by the present network node (and the present network control terminal), the emitting power of the CSI RS ports is 0, and these ports are zero power (ZP) CSI RS ports. Under normal circumstances, the RSRP of such CSI RS ports should be low In the present embodiment, it is unnecessary for the network node served by the network control terminal to measure the RSRP of all CSI RS ports, but only measure the RSRP of a specific CSI RS port(s). The CSI RS port(s) to be measured is determined by the first determining unit 101 according to the first indication information received from the adjacent network control terminal. The first indication information indicates interference status of CSI RS ports used by the corresponding adjacent network control terminal, which is obtained, for example, by the network node of the adjacent network control terminal through measuring RSRP of NZP CSI RS ports of the network node of the adjacent network control terminal. The first indication information may be adapted, for example, to indicate a CSI RS port that may produce interferences to a network node of the present network control terminal among the CSI RS ports used by the adjacent network control terminal.

In one example, the first indication information indicates information of a CSI RS port of which the RSRP is below a first predetermined threshold among the CSI RS ports used by the adjacent network control terminal, and the first determining unit 101 is configured to determine the CSI RS port of which the RSRP is below the first predetermined threshold as the CSI RS port to be measured by the network node.

As described above, a CSI RS port used by the adjacent network control terminal is NZP CSI RS port for the adjacent network control terminal itself. If the measured RSRP of a certain NZP CSI RS port is low, it means that a part of the power of a beam corresponding to the CSI RS port may be received by a network node served by another network control terminal (for example, the present network control terminal corresponding to the electronic apparatus 100), that is, the beam corresponding to the CSI RS port may produce interferences to the network node of anther network control terminal. Thus, information of such CSI RS port is contained in the first indication information, and provided to another network control terminal (for example, the present network control terminal corresponding to the electronic apparatus 100).

Whether RSRP of a NZP CSI RS port is too low may be measured by the first predetermined threshold. The first predetermined threshold, for example, may be set according to the emitting power of the above adjacent network control terminal.

In addition, the first indication information may further include information of correspondence relationship between the CSI RS port of which the RSRP is below the first predetermined threshold and a beam, and the information, for example, may be used for determining the beam producing interferences.

Figure 3:
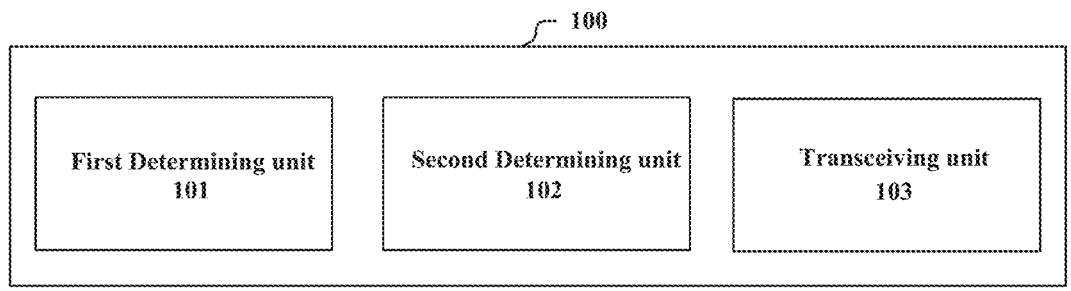
FIG. 3 is a block diagram illustrating functional modules of an electronic apparatus for a network control terminal according to an embodiment of the present disclosure.

As shown in FIG. 3, the electronic apparatus 100 may further correspondingly include a transceiving unit 103, configured to receive, from the adjacent network control terminal, the first indication information. Illustratively, the transceiving unit 103 may be configured to receive the first indication information via an X2 interface. The transceiving unit 103, for example, may be implemented as a communication interface.

Further, the network control terminal receiving the first indication information indicates the network node served by the network control terminal to measure the PSRP of the CSI RS port(s) contained in the first indication information. For the network control terminal, these CSI RS ports are not used, that is, are ZP CSI RS ports. Thus, if the measured RSRP is high, it means that the CSI RS ports are subjected to interferences from beams of other network control terminals. In this regard, the second determining unit 102 may determine whether the present network node is subjected to interferences from an adjacent network control terminal, and may determine the specific one or more CSI RS ports producing interferences by measuring RSRP of the above CSI RS ports. In addition, the network control terminals may exchange respective CSI RS configuration information with each other. For example, the network control terminal may obtain, when receiving the first indication information, information of the adjacent network control terminal and the CSI RS port to be measured among the CSI RS ports used by the adjacent network control terminal. Therefore, the network control terminal has known correspondence relationship between the adjacent network control terminal and the CSI RS port to be measured, so that the network control terminal may determine, based on the CSI RS ports producing interferences, these CSI RS ports producing interferences belong to which specific adjacent network control terminal.

In one example, the measurement result of the network node may include information of port numbers of at least a part of CSI RS ports of which the measured RSRP is higher than a second predetermined threshold. The second predetermined threshold may also be set based on the emitting power of the network control terminal. As described above, when the measured RSRP is higher than the second predetermined threshold, it means that the CSI RS port corresponding to the measured RSRP is interfered by the adjacent network control terminal. In the case that there are multiple CSI RS ports of which RSRP is higher than the second predetermined threshold, the network node may only transmit port numbers of a part of CSI RS ports to the network control terminal, for example, may only transmit the port number of the CSI RS port with the highest RSRP.

The port number is represented, for example, by a signal M, that is, M may be the corresponding port number. For example, in the current protocol, the CSI RS port is from 15 to 22. Each port has a corresponding port number, port 15 has a port number of 1, and port 16 has a port number of 2, and so on.

Assuming that each network control terminal is configured with R CSI RS ports at most, the signal M may include an information element of $\lceil \log_2(R) \rceil$ bits indicating the CSI RS port producing the interferences. In the case where R is 16, M may include a 4-bit information element.

The second determining unit 102 may analyze the signal M to obtain information of the CSI RS port producing the interferences, and determine the adjacent network control terminal producing the interferences based on the correspondence relationship between the adjacent network control terminal and the CSI RS ports.

Alternatively, the signal M may also include two parts for indicating respectively the network control terminal producing the interferences and the CSI RS port producing interferences of the network control terminal. If there are N adjacent network control terminals, and each of the network control terminals is configured with R CSI RS ports at most, the signal M may include an information element of the following number of bits: $\lceil \log_2(N) \rceil$ bits adapted to indicate the network control terminal producing the interferences, and $\lceil \log_2(R) \rceil$ bit adapted to indicate the CSI RS port producing the interferences. In the case where N is 6 and R is 16, M may contain information of 7 bits, where 3 bits are adapted to indicate the network control terminal producing interferences, and 4 bits are adapted to indicate the CSI RS port producing interferences.

In this case, the second determining unit 102 may analyze the signal M to obtain information of the adjacent network control terminal and CSI RS port thereof producing the interferences.

In addition, the second determining unit 102 may further determine, based on the information of the correspondence relationship between the port and the beam contained in the first indication information, the interfering beam corresponding to the CSI RS port producing the interferences. For example, it is assumed that the ports used by beam b are 15, 16, 17, and 18, respectively, in the case where port 15 is the CSI RS port producing interferences, the beam b is considered to be the interfering beam since the port 15 is used by beam b.

Figure 4:
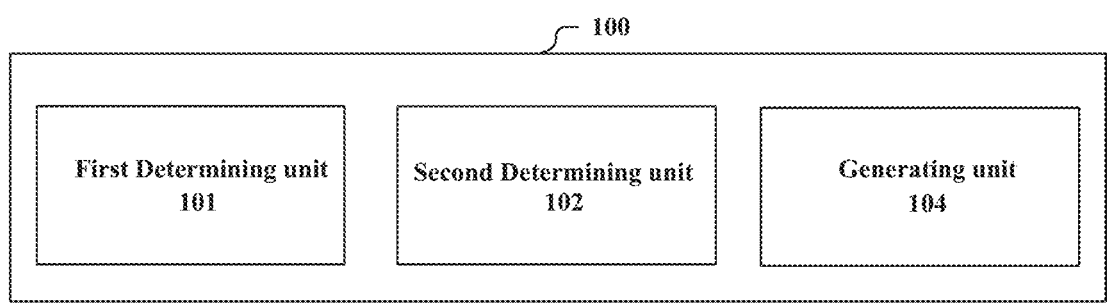
FIG. 4 is a block diagram illustrating functional modules of an electronic apparatus for a network control terminal according to an embodiment of the present disclosure.

In addition, as shown in FIG. 4, an electronic apparatus 100 may further include a generating unit 104, configured to generate interference indication information with respect to the adjacent network control terminal producing interferences to the network node, to indicate the CSI RS port producing interferences to the network node.

Although it is not shown in FIG. 4, the electronic apparatus may further include the transceiving unit 103 as shown in FIG. 3. Accordingly, the transceiving unit 103 may be configured to transmit interference indication information to an adjacent network control terminal. The generating unit 104 may be implemented by one or more processing circuitries, which may be implemented as for example a chip.

In one example, the generating unit 104 may generate the interference indication information based on the analysis result of the signal M by the second determining unit 102 as described above.

In other words, the interference indication information includes the port number of the CSI RS port producing the interferences. For example, the interference indication information may be represented by a signal C. In the case where the signal M only includes the port number of CSI RS port, the signal C is the same as the signal M, and in the case where the signal M further includes bits indicating the adjacent network control terminal producing interferences, signal C is for example the last $\lceil \log_2(R) \rceil$ bits of signal M.

On the other hand, after the adjacent network control terminal receives the interference indication information, the beam producing interferences may be determined according to the information of the CSI RS port therein. For example, assuming that the ports used by beam b are 15, 16, 17, and 18, respectively, in the case where the port number indicated by signal C is 0001, it means that port 15 is the CSI RS port producing interferences. Accordingly, beam b is determined to be the beam producing the interferences.

Illustratively, in order to mitigate or eliminate interferences, the adjacent network control terminal may switch the beam producing interferences from beam-forming CSI RS to non-precoded CSI RS, or multiplex the beam with the present network control terminal in a time-division manner.

The generating unit 104 may be configured to generate one piece of interference indication information each time receiving the measurement result of one network node, or may summarize the measurement results received within a certain time period to generate one piece of interference indication information. In the latter case, for example, one piece of interference indication information may be generated for all measurement results with respect to the same CSI RS port of the same adjacent network control terminal received within a certain time period, or one piece of interference indication information is generated only when the number of measurement results with respect to the same CSI RS port of the same adjacent network control terminal received within a certain time period exceeds a predetermined number. The specific generation method may be determined depending on the scenario and requirements of the actual application.

In addition, the generating unit 104 is further configured to: in the case that the transceiving unit 103 receives no first indication information from the adjacent network control terminal within the first predetermined time of period after the generating unit 104 generates the interference indication information, modify the interference indication information into a format of including no CSI RS port to indicate to the adjacent network control terminal.

That is, if no first indication information is received within the first predetermined time of period, it means that there is no mutual interference during this time of period, and the interference indication information may be set to be empty, so that the adjacent network control terminal may restore to normal use of the previously operated beam after receiving the new the interference information, for example, switch back to beam-forming CSI RS or stop multiplexing in a time-division manner. It should be understood that the generating unit 104 may also generate signals in other forms to instruct the adjacent network control terminal to restore the normal use of beam.

The electronic apparatus 100 according to the embodiment may determine the adjacent network control terminal and CSI RS port thereof producing interferences to the network node by using the measurement result of RSRP of the specific CSI RS port by the network node, thereby facilitating reducing interferences between service areas of the network control terminals.

Second Embodiment

Figure 5:
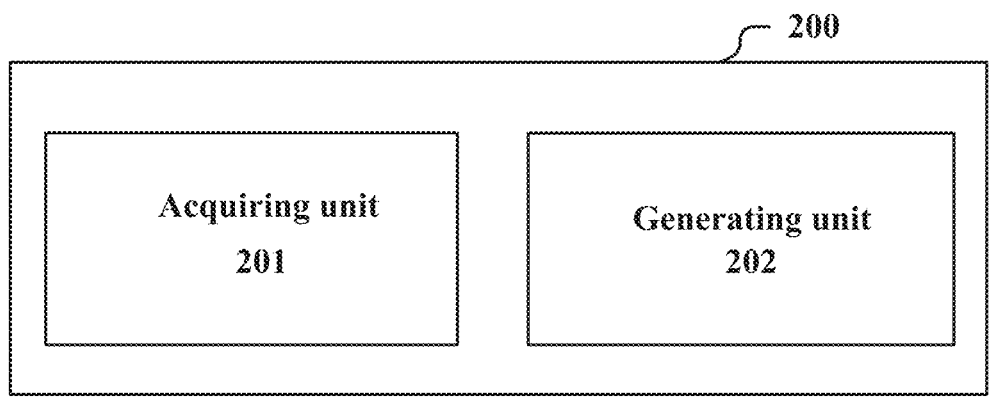
FIG. 5 is a block diagram illustrating functional modules of an electronic apparatus for a network control terminal according to another embodiment of the present disclosure.

FIG. 5 is a block diagram illustrating functional modules of an electronic apparatus 200 for a network control terminal according to another embodiment of the present disclosure. As shown in FIG. 5, the electronic apparatus 200 includes: an acquiring unit 201, configured to acquire, from a network node served by the present network control terminal, a measurement result of RSRP by the network node with respect to CSI RS ports used by the present network control terminal; and a generating unit 202, configured to generate, based on the measurement result, a first indication information indicating interference status of the CSI RS ports used by the present network control terminal.

The acquiring unit 201 and the generating unit 202, for example, may be implemented by one or more processing circuitries which may be implemented as for example a chip.

The network node measures the RSRP of the CSI RS ports used by the present network control terminal when a particular condition is satisfied, and provides the measurement result to the present network control terminal. This particular condition is, for example, that the QoS of the network node drops below a predetermined level.

As described above, the CSI RS ports used by the present network control terminal are the NZP CSI RS ports. In the case where the RSRP measured by the network node is too low, for example, lower than a first predetermined threshold, it means that the beam corresponding to the CSI RS ports may be received by the network node of another network control terminal, that is, the beam may produce interferences to the network node of the other network control terminal. The first predetermined threshold may be set according to the emitting power of the network control terminal. Therefore, in one example, the network node may transmit the information of the CSI RS ports as a measurement result to the network control terminal.

For example, the information of the above CSI RS ports may be represented in a bit sequence or a bit bitmap by the network node. Specifically, the bit corresponding to the CSI RS port of which RSRP is below the first predetermined threshold may be set to 0, and the remaining bits are set to 1.

After the acquiring unit 201 acquires the measurement result containing the information of the above CSI RS ports, the generating unit 202 may generate first indication information accordingly, where the first indication information indicates an interference status of the CSI RS ports used by the present network control terminal, for example, may include information of CSI RS ports corresponding to beams that may produce interferences to network nodes of adjacent network control terminals. The first indication information is adapted to instruct the adjacent network control terminal to measure the RSRP of the CSI RS ports to determine whether interferences are actually produced.

The acquiring unit 201 may generate the first indication information based on the measurement result of each network node or may generate the first indication information, only in the case that the measurement results of more than or equal to a predetermined number of network nodes are consistent.

Figure 6:
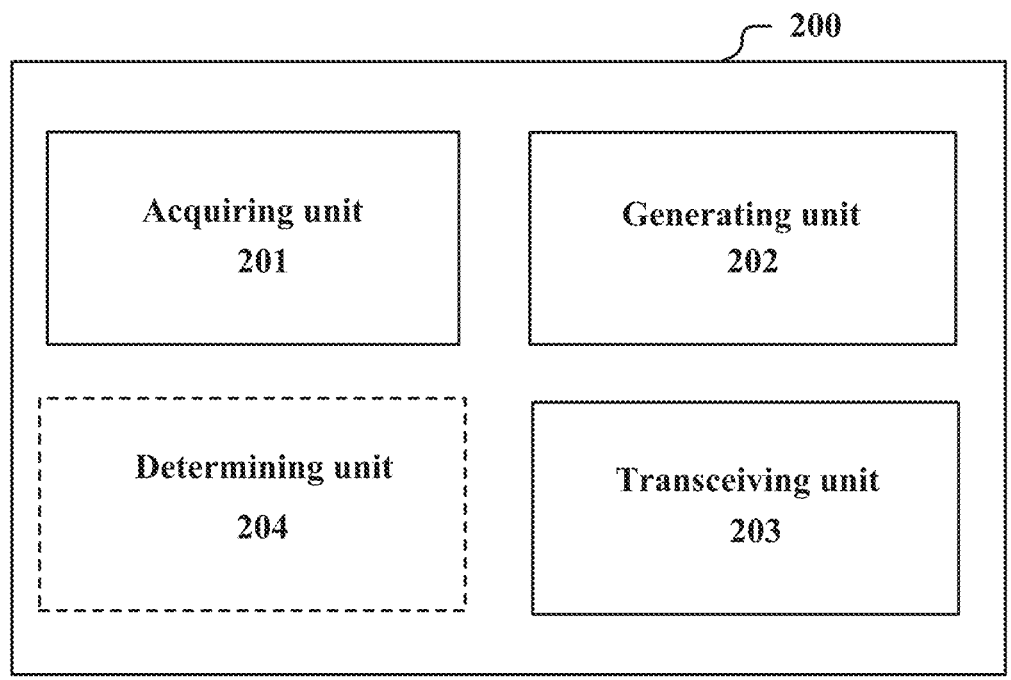
FIG. 6 is a block diagram illustrating functional modules of an electronic apparatus for a network control terminal according to another embodiment of the present disclosure.

Correspondingly, as shown in FIG. 6, the electronic apparatus 200 may further include a transceiving unit 203, configured to receive the measurement result from the network node and transmit the first indication information to the adjacent network control terminal. The first indication information, for example, may include information of a CSI RS port of which the RSRP is below a first predetermined threshold among the CSI RS ports used by the network control terminal. In addition, the first indication information may further include information of correspondence relationship between the CSI RS port and a beam.

The adjacent network control terminal, after receiving the first indication information, may indicate the network node served by the adjacent network control terminal to measure the RSRP of the corresponding CSI RS port according to the interference status information therein, so as to determine, for example, which CSI RS ports are actually interfered according to the measurement result. For example, the determination method described in the first embodiment may be adopted, that is, the CSI RS port of which the measured RSRP is higher than a second predetermined threshold is the interfered CSI RS port. Subsequently, the information of the interfered CSI RS port is contained in the interference indication information by the adjacent network control terminal to provide to the present network control terminal.

Correspondingly, the transceiving unit 203 is further configured to receive, from the adjacent network control terminal, interference indication information indicating a CSI port producing interferences to a network node served by the adjacent network control terminal among the CSI RS ports used by the present network control terminal. Similar to the first embodiment, the interference indication information may be represented, for example, by a signal C, which is the port number of the corresponding CSI RS port.

As shown in the dashed line block in FIG. 6, an electronic apparatus 200 may further include a determining unit 204, configured to determine, based on the interference indication information, an interfering beam producing interferences to the network node served by the adjacent network control terminal. Specifically, the determining unit 204 may determine, based on the correspondence relationship between the CSI RS ports of the present network control terminal and the beam, a beam corresponding to the CSI RS port contained in the interference indication information as the interfering beam.

For example, it is assumed that the ports used by the beam b are 15, 16, 17, and 18, respectively. In the case where the interference indication information indicates that the port 15 is a CSI RS port producing interferences, the beam b is determined to be a beam producing interferences accordingly.

In addition, the determining unit 204 may be further configured to switch the determined interfering beam from beam-forming CSI RS to non-precoded. CSI RS, or multiplex the interfering beam with the adjacent network control terminal in a time-division manner. Interferences to the network node of the adjacent network control terminal can be effectively reduced by performing such processing, thereby improving overall communication quality.

In one example, the determining unit 204 may also be configured to perform the above switching processing or time-division multiplexing processing, when more than or equal to a predetermined number of pieces of interference indication information with respect to the same interfering beam are received within a second predetermined time of period. For example, it is assumed that the ports used by beam b are 15, 16, 17 and 18, respectively, and the predetermined number is two. If interference indication information indicating port 15 and port 16 is received from two adjacent network control terminals, respectively, or two pieces of interference indication information indicating the port 15 are received from one adjacent network control terminal, the switching processing or the time-division multiplexing processing is performed, since it is can be determined that the beam b is the interfering beam based on each of the two pieces of interference indication information and thus the above condition is satisfied.

In this case, a certain beam of the present network control terminal produces interferences to multiple adjacent network control terminals and/or multiple network nodes served by one adjacent network control terminal, that is, the interfering beam has a great effect. Just processing such an interfering beam may avoid unnecessary frequent switching, thereby facilitating maintaining the stability and efficiency of the system.

Further, the determining unit 204 may be further configured to switch the interfering beam from non-precoded CSI RS to beam-forming CSI RS, or stop multiplexing the interfering beam in a time-division manner, in response to the interference indication information containing no CSI RS port from the adjacent network control terminal. The interference indication information containing no CSI RS port indicates that the interference status no longer exists. Therefore, the present network control terminal may restore normal use of the interfering beam.

It should be understood that, the electronic apparatus 200 according to the present embodiment and the electronic apparatus 100 according to the first embodiment may be used for the network control terminal together, or may be used separately, which should not be limitative.

The electronic apparatus 200 according to the present embodiment may provide an interference status of its CSI RS ports to the adjacent network control terminal, and perform corresponding operations according to the interference indication information from the adjacent network control terminal to avoid or mitigate the interferences of the present network control terminal to the network node of the adjacent network control terminal.

Third Embodiment

Figure 7:
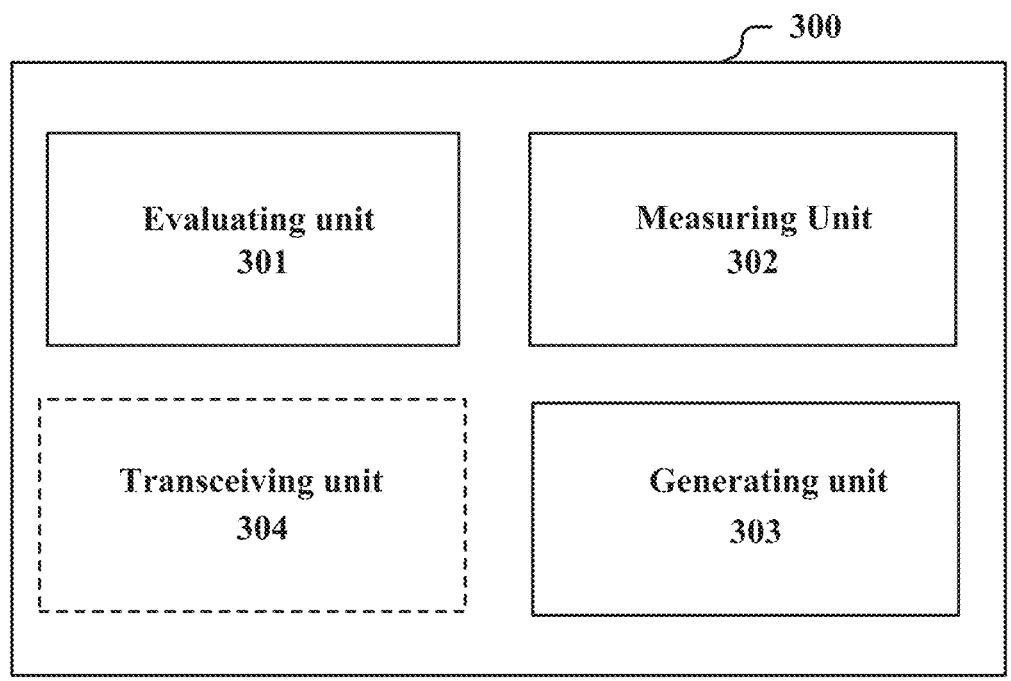
FIG. 7 is a block diagram illustrating functional modules of an electronic apparatus for a network node according to an embodiment of the present disclosure.

FIG. 7 is a block diagram illustrating functional modules of an electronic apparatus 300 for a network node according to an embodiment of the present disclosure. The electronic apparatus 300 includes: an evaluating unit 301, configured to evaluate quality of service of a network node; a measuring unit 302, configured measure RSRP of CSI RS ports used by the network node, when the quality of service is lower than a predetermined level; and generating unit 303, configured to generate, based on a measurement result, information indicating interference status of the CSI RS ports.

The evaluating unit 301, the measuring unit 302 and the determining unit 303, for example, may be implemented by one or more processing circuitries which may he implemented as for example a chip.

In addition, as shown in the dashed line block in FIG. 7, the electronic apparatus 300 may further include a transceiving unit 304, configured to transmit the generated information indicating the interference status of the CSI RS ports to the network control terminal.

The evaluating unit 301, for example, may evaluate the QoS of the network node, in various ways. When the QoS is lower than a predetermined level, it means that interferences between the service areas of the network control terminals may be produced. Therefore, the measuring unit 302 measures the RSRP of the CSI RS ports used by the network node. For example, in the case that the measurement result of the RSRP of a certain CSI RS port is lower than the first predetermined threshold, the beam corresponding to the CSI RS port may be considered to produce interferences to the network nodes of other adjacent network control terminals. Accordingly, the generating unit 303 may generate information indicating the interference status of the CSI RS port. For example, the information may include information indicating a CSI RS port of which the measured RSRP is lower than a first predetermined threshold.

In one example, the information may be in the form of a bit sequence or a bit bitmap. The CSI RS port of which the measured RSRP is less than the first predetermined threshold corresponds to a bit 0, and the remaining CSI RS ports correspond to bit 1.

As can be seen from the above description, the generation and reporting of information indicating the interference status of the CSI RS ports is trigger based, that is, is triggered based on the QoS degradation. The network control terminal, after receiving the reported information, generates, based on the reported information, first indication information to indicate the interference status of the CSI RS ports used by the present network control terminal. The first indication information may be provided to other adjacent network control terminals to perform RSRP measurement with respect to the CSI RS port contained therein.

Correspondingly, the present network control terminal may also receive the first indication information transmitted by the adjacent network control terminal from the adjacent network control terminal. The measuring unit 302 may be further configured to measure the RSRP of a CSI RS port which is determined to be measured by a network control terminal based on the first indication information from the adjacent network control terminal, and report a measurement result to the network control terminal. The first indication information indicates interference status of a CSI RS port used by the corresponding adjacent network control terminal.

For example, the first indication information contains information of a CSI RS port of which the RSRP is lower than the first predetermined threshold among the CSI RS ports of the adjacent network control terminal, and the measuring unit 302 measures RSRP with respect to the CSI RS ports.

The measuring unit 302 may report information of a port number of at least a part of CSI RS ports of which the measured RSRP is higher than a second predetermined threshold, to the network control terminal. For a network node, the CSI RS port used by the adjacent network control terminal is a ZP CSI RS port. Therefore, when the measured RSRP is high (for example, higher than a second predetermined threshold), it means that the network node is affected by the beam from the adjacent network control terminal. The measuring unit 302 may report the port number of such a CSI RS port to the network control terminal, so that the network control terminal may notify the corresponding adjacent network control terminal that the beam corresponding to the CSI RS port produces interferences.

In one example, the measuring unit 302 may report the information of the pork number of the CSI RS port with the highest RSRP among the CSI RS ports of which the measured RSRP is higher than the second predetermined threshold to the network control terminal.

The electronic apparatus 300 according to this embodiment is capable of determining an interference status of CSI RS ports in response to a decrease in quality of service, thereby providing a basis for determining the presence of interferences. In addition, the electronic apparatus 300 is also capable of measuring a specific CSI RS of other adjacent network control terminals to determine another adjacent network control terminal and the CSI RS port thereof producing interferences, thereby facilitating avoiding or mitigating interferences.

Figure 8:
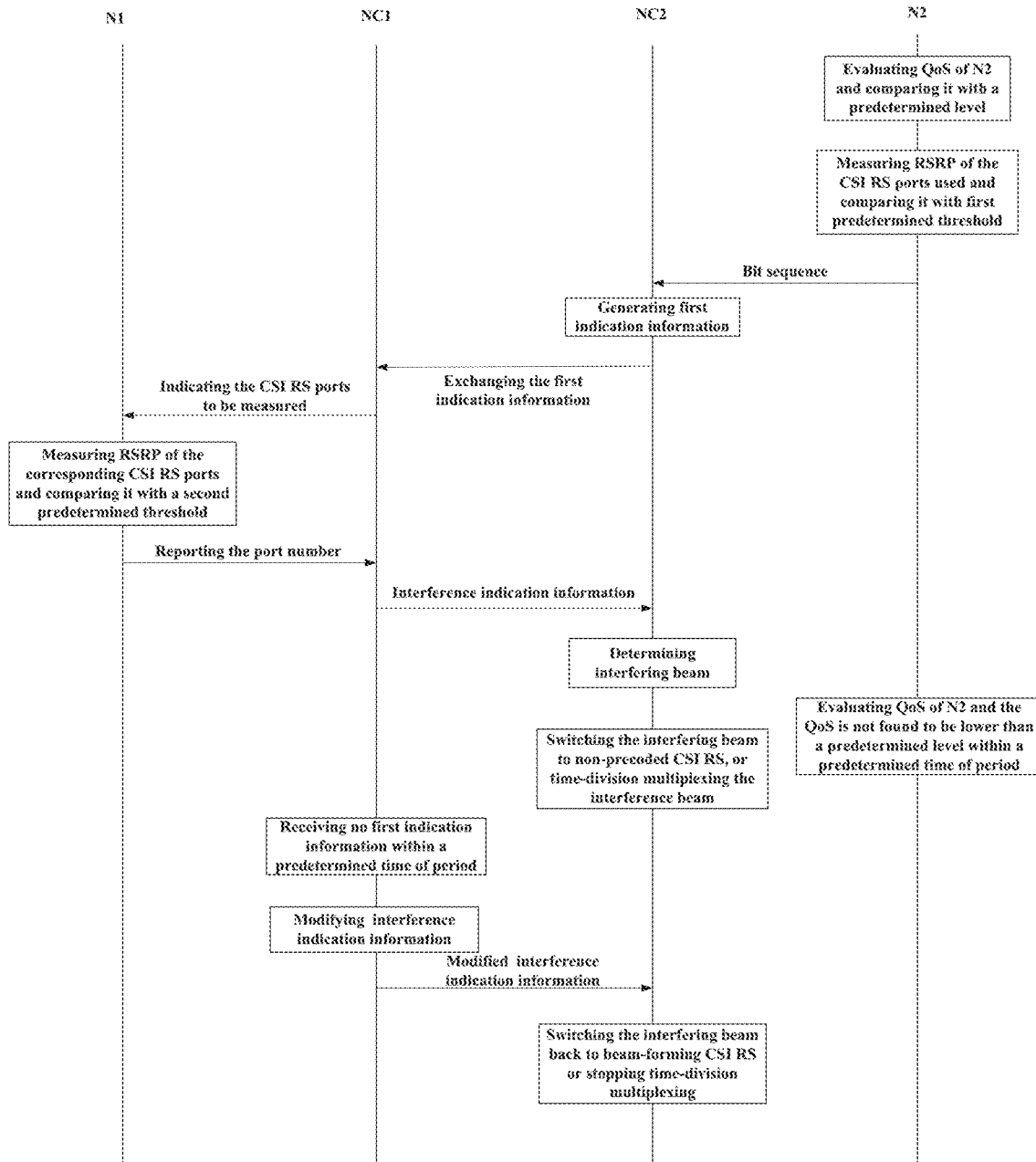
FIG. 8 illustrates an example of a related information procedure between a network control terminal and a network node to which the technology of the present disclosure is applied.

For ease of understanding, FIG. 8 illustrates an example of information procedure regarding interference avoidance or mitigation between the network control terminal and the network node. In FIG. 8, a network control terminal 2 (NC2) producing interferences and a network control terminal 1 (NC1) that is interfered are illustrated as an example. However, it should be understood that the information procedure may be performed simultaneously among multiple network control terminals. In addition, the network control terminal may also serve multiple network nodes.

As shown in FIG. 8, the network node (N2) of NC2 evaluates QoS of the N2 and compares the QoS with a predetermined level. When the QoS is lower than the predetermined level, N2 measures the RSRP of the CSI RS ports used by NC2 and N2, and compares the RSRP with a first predetermined threshold. Subsequently, N2 transmits a bit sequence indicating the interference status of the CSI RS ports to the network control terminal, the CSI RS port of which the RSRP is lower than the first predetermined threshold in the bit sequence corresponds to a bit 0, and the remaining CSI RS ports correspond to bit 1. The NC2, after receiving the reporting of the bit sequence of N2, generates first indication information, which may include information of the CSI RS ports corresponding to bit 0. Next, the NC2 transmits the first indication information to the NC1, for example, via an X2 interface. The NC1 determines a CSI RS port to be measured by N1 served by NC1 based on the first indication information, and transmits an indication to N1. The N1 measures the RSRP of the corresponding CSI RS port and compares the measurement result with the second predetermined threshold, and reports the port number of the CSI RS port with the highest RSRP among the CSI RS port of which RSRP is higher than the second predetermined threshold to NC1. The NC1 correspondingly generates interference indication information with respect to the NC2, where the interference indication information includes the port number of the CSI RS port. The NC2 may determine the interfering beam producing the interferences based on the port number, and switch the interfering beam to the non-precoded CSI RS or multiplex the interfering beam in a time-division manner with the NC1 to eliminate or mitigate the interferences.

Subsequently, N2 continues to evaluate QoS of the N2, and if the QoS is not found to be lower than a predetermined level within a predetermined time of period, the bit sequence is not reported to NC2. Accordingly. NC2 does not generate and transmit a new first indication information. In this case, NC1 does not receive new first indication information from NC2 within a predetermined time of period, modifies the interference indication information so as to contain no information of CSI RS port and transmits the modified interference indication information to NC2. The NC2, after receiving the modified interference indication information, switches the foregoing interfering beam back to the beamforming CSI RS or stops multiplexing the interfering beam in a time-division manner.

It should be noted that NC1 and NC2 may be functionally equivalent, that is, NC1 may also perform functions of NC2, and NC2 may also perform functions of NC1. Similarly, N1 and N2 are functionally equivalent, N1 may also perform the functions of N2, and N2 may also perform the functions of N1.

In the case of combing with the scenario in FIG. 1, NC1 is, for example, BS1; N1 is, for example, UE1; NC2 is, for example, BS2; and N2 is, for example, UE2. However, it should be understood that the embodiment of the present disclosure is not limited to the scenario in FIG. 1, and the information procedure that may be employed is not limited to that shown in FIG. 8, but may be appropriately modified according to actual applications.

Fourth Embodiment

In the process of describing the electronic apparatus in the embodiments described above, obviously, some processing and methods are also disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware, the method described below may be executed by a computer-executable program completely, although the hardware and/or firmware of the apparatus can also be used in the methods.

Figure 9:
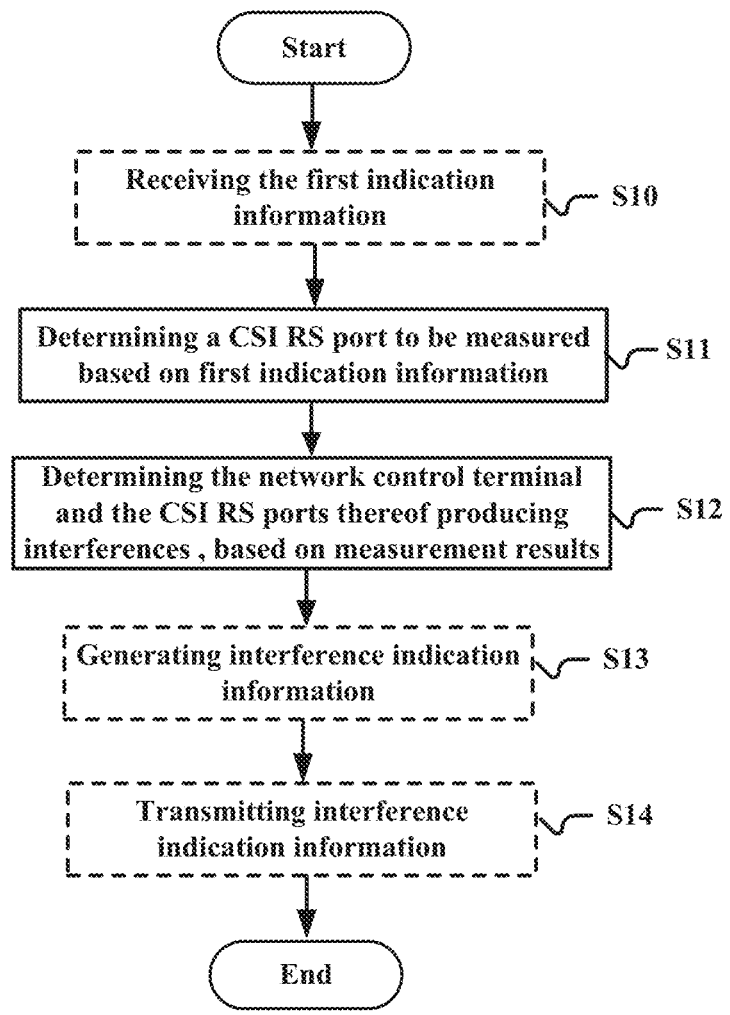
FIG. 9 is a flowchart illustrating a method for a network control terminal according to an embodiment of the present disclosure.

FIG. 9 is a flowchart illustrating a method for a network control terminal according to an embodiment of the present disclosure. The method includes: determining, based on first indication information from an adjacent network control terminal, a channel status information reference signal (CSI RS) port of which RSRP is to be measured by a network node served by the present network control terminal (S11), where the first indication information indicates interference status of CSI RS ports used by the corresponding adjacent network control terminal; and determining, based on a measurement result from the network node, an adjacent network control terminal and a CSI RS port thereof producing interferences to the network node (S12).

In addition, as shown in the dashed line block in FIG. 9, the above method may further include step S10: receiving the first indication information from the adjacent network control terminal, for example, receiving the first indication information via an X2 interface.

The above method may further include step S13: generating interference indication information with respect to the adjacent network control terminal producing interferences to the network node, to indicate the CSI RS port producing interferences to the network node. In step S14, the interference indication information may be transmitted to the adjacent network control terminal.

In one example, the first indication information indicates information of a CSI RS port of which the RSRP is below a first predetermined threshold among the CSI RS ports used by the adjacent network control terminal, and in step S11, the CSI RS port of which the RSRP is below a first predetermined threshold may be determined as the CSI RS port to be measured by the network node. The first predetermined threshold, for example, may be set according to an emitting power of the adjacent network control terminal.

The first indication information may further include information of correspondence relationship between the CSI RS port of which the RSRP is below the first predetermined threshold and a beam. The measurement result may include information of a port number of at least a part of CSI RS ports of which the measured RSRP is higher than a second predetermined threshold.

In addition, although not shown in the figure, the method may further include: modifying the interference indication information into a format of not including any CSI RS port and transmitting the modified interference indication information to the adjacent network control terminal, in the case that no first indication information is received from the adjacent network control terminal within a first predetermined time of period after generating the interference indication information in step S13.

Figure 10:
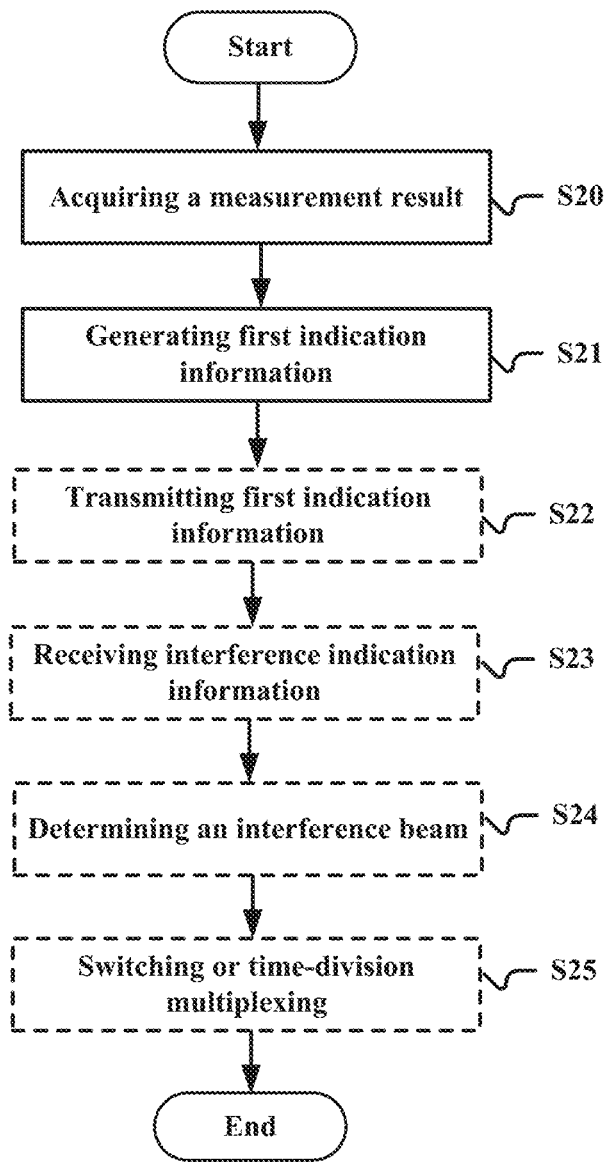
FIG. 10 is a flowchart illustrating a method for a network control terminal according to another embodiment of the present disclosure.

FIG. 10 is a flowchart illustrating a method for a network control terminal according to another embodiment of the present disclosure. The method includes: acquiring, from a network node served by the present network control terminal, a measurement result of RSRP by the network node with respect to CSI RS ports used by the present network control terminal (S20); and generating, based on the measurement result, a first indication information indicating interference status of the CSI RS ports used by the present network control terminal (S21).

In one example, in step S21, the first indication information is generated in the case that the measurement results of more than or equal to a predetermined number of network nodes are consistent.

In addition, as shown in the dashed line block in FIG. 10, the above method may further include step S22: transmitting the first indication information to the adjacent network control terminal.

In one example, the above method may further include: receiving interference indication information from the adjacent network control terminal (S23), where the interference indication information indicates a CSI RS port producing interferences to a network node served by the adjacent network control terminal among the CSI RS ports used by the present network control terminal; and determining, based on the interference indication information, an interfering beam producing interferences to the network node served by the adjacent network control terminal (S24).

The above method may further include step S25: after the interfering beam is determined, switching the determined interfering beam from beam-forming CSI RS to non-precoded CSI RS, or multiplexing the interfering beam with the adjacent network control terminal in a time-division manner. The step S25 may also be performed in the following case: more than or equal to a predetermined number of pieces of interference indication information with respect to the same interfering beam are received within a second predetermined time of period.

In addition, although not shown in FIG. 10, the above method may further include: switching the interfering beam from non-precoded CSI RS to beam-forming CSI RS, or stopping multiplexing the interfering beam in a time-division manner, in response to the interference indication information containing no CSI RS port from the adjacent network control terminal.

Figure 11:
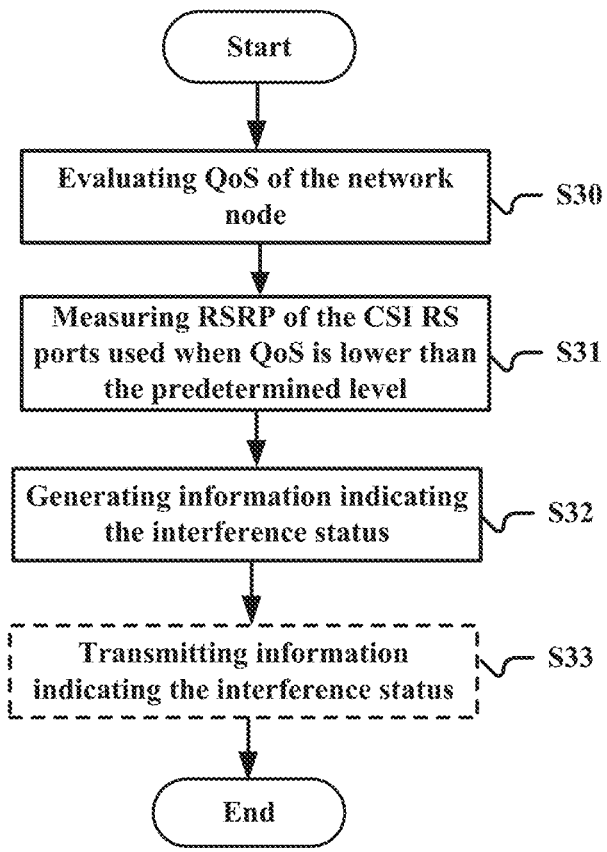
FIG. 11 is a flowchart illustrating a method for a network node according to an embodiment of the present disclosure.

FIG. 11 is a flowchart illustrating a method for a network node according to an embodiment of the present disclosure. The method includes: evaluating quality of service of a network node (S30); measuring RSRP of CSI RS ports used by the network node, when the quality of service is lower than a predetermined level (S31); and generating, based on a measurement result, information indicating interference status of the CSI RS ports (S32).

For example, the information may include information indicating a CSI RS port of which the measured RSRP is lower than a first predetermined threshold. The information may be in the form of a bit sequence or a bit bitmap. The bit corresponding to the CSI RS port of which the measured RSRP is less than the first predetermined threshold is 0, and the bits corresponding to the remaining CSI RS ports are 1.

In addition, as shown in the dashed line block in FIG. 11, the method may further include step S33: transmitting the generated information indicating the interference status of the CSI RS ports to the network control terminal.

Although not shown in FIG. 11, the above method may further include: measuring the RSRP of a CSI RS port which is determined to be measured by a network control terminal based on a first indication information from an adjacent network control terminal, and reporting a measurement result to the network control terminal, where the first indication information indicates interference status of CSI RS ports used by the corresponding adjacent network control terminal. For example, information of a port number of at least a part of CSI RS ports of which the measured RSRP is higher than a second predetermined threshold may be reported to the network control terminal.

It is to be noted that, the above methods may be performed separately or in combination with each other, and the detailed descriptions thereof are presented in the first embodiment to the third embodiment and are not repeated herein.

In summary, with the electronic apparatus and method according to the present disclosure, the circumstance of the interferences being produced between the service areas of the adjacent network control terminals can be determined and the network control terminal and the CSI RS port thereof producing the interferences can be determined, by measuring RSRP of the CSI RS ports, whereby measures can be taken to effectively eliminate or mitigate the interferences.

APPLICATION EXAMPLES

The technology of the present disclosure is applicable to various products. For example, the above mentioned base station may be realized as any type of evolved Node B (eNB) such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of user equipments, which will be described below, may each operate as the base station by temporarily or semi-persistently executing a base station function.

[Application Example Regarding Base Station]

First Application Example

Figure 12:
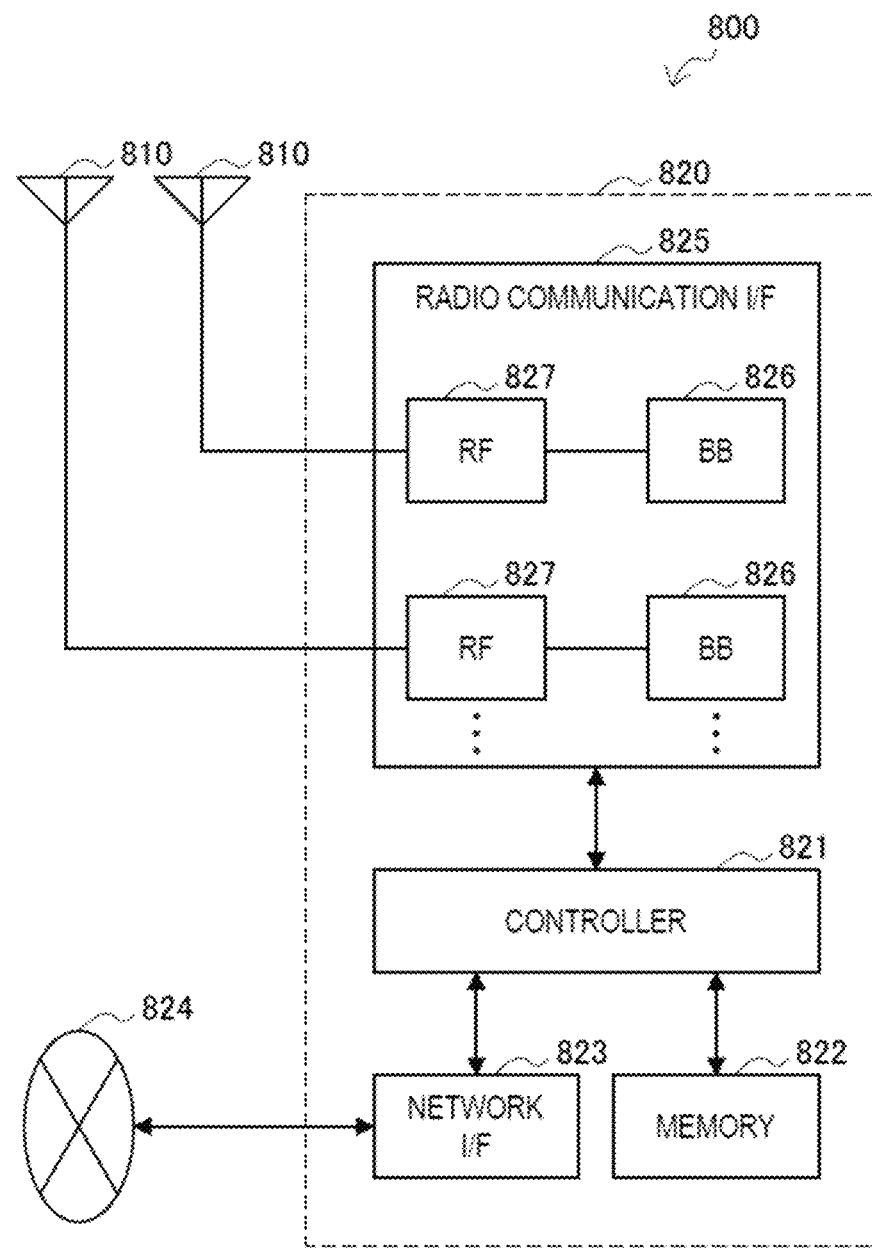
FIG. 12 is a block diagram illustrating a first example of a schematic configuration of an evolved Node B (eNB) to which the technology of the present disclosure may be applied.

FIG. 12 is a block diagram showing a first example of a schematic configuration of an eNB to which the technique of the disclosure can be applied. An eNB 800 includes one or more antennas 810 and a base station apparatus 820. The base station device 820 and each antenna 810 may be connected with each other via RF cable.

Each of the antennas 810 includes one or more antenna elements (such as multiple antenna elements included in an MIMO antenna), and is used for the base station apparatus 820 to transmit and receive radio signals. The eNB 800 may include the multiple antennas 810, as illustrated in FIG. 17. For example, the multiple antennas 810 may be compatible with multiple bands used by the eNB 800. Although the eNB 800 including multiple antennas 810 is illustrated in FIG. 12, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in conjunction with an adjacent eNB or a core network node. The memory 822 includes a RAM and a ROM, and stores programs to be performed by the controller 821 and various types of control data (such as a terminal list, transmission power data and scheduling data).

The network interface 823 is a communication interface for connecting the base station device 820 to the core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may be a wired communication interface or a radio communication interface for wireless backhaul routing. If the network interface 823 is a radio communication interface, the network interface 823 may use a frequency band for wireless communication higher than that used by the radio communication interface 825.

The radio communication interface 825 supports any cellular communication scheme (such as Long Term Evolution (LTE) and LTE-advanced), and provides a radio connection to a terminal located in a cell of the eNB 800 via the antenna 810. The radio communication interface 825 may typically include, for example, a baseband (BB) processor 826 and an RP circuit 827. The BB processor 826 may perform, for example, encoding/decoding, modulating/demodulating, and multiplexing/demultiplexing, and performs various types of signal processing of layers (such as L1 a medium access control (MAC), a radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. The function of the BB processor 826 may be changed when the programs are updated. The module may be a card or a blade that is inserted into a slot of the base station apparatus 820.

Alternatively, the module may also be a chip that is mounted on the card or the blade. Meanwhile, the RF circuit 827 may include, for example, a mixer, a filter, and an amplifier, and transmits and receives radio signals via the antenna 810.

As shown in FIG. 12, the radio communication interface 825 may include multiple BB processors 826. For example, the multiple BB processors 826 may be compatible with multiple frequency bands used by the eNB 800. The radio communication interface 825 may include the multiple RF circuits 827, as illustrated in FIG. 12. For example, multiple RF circuits 827 may be compatible with multiple antenna elements. Although an example in which the radio communication interface 825 includes multiple BB processors 826 and multiple RF circuits 827 is illustrated in FIG. 12, the radio communication interface 825 may include a single 133 processor 826 and a single RF circuit 827.

In the eNB 800 illustrated in FIG. 12, the transceiving unit 103 described with reference to FIG. 3 and the transceiving unit 203 described with reference to FIG. 6 may be implemented by the radio communication interface 825. At least part of the functions may be implemented by the controller 821. For example, the controller 821 may perform the determination of the adjacent network control terminal and CSI RS ports thereof producing the interference and the generation of the interference indication information by performing the functions of the first determining unit 101, the second determining unit 102, and the generating unit 104, and/or perform the generation of the first indication information and the determination of the interfering beam as well as the processing of the interferences by performing the functions of the acquiring unit 201, the generating unit 202, and the determining unit 204.

Second Application Example

Figure 13:
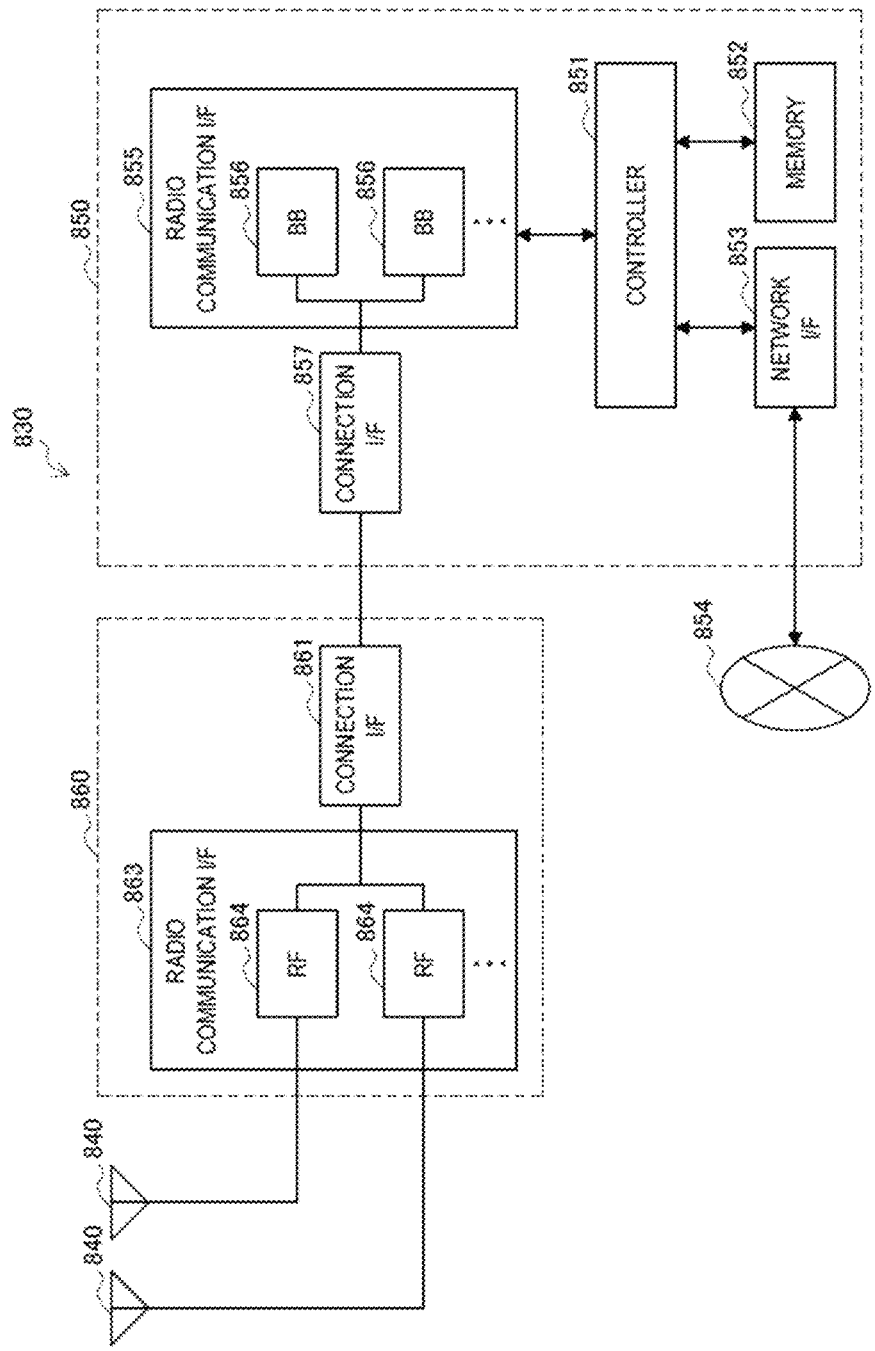
FIG. 13 is block diagram illustrating a second example of a schematic configuration of an eNB to which the technology of the present disclosure can be applied.

FIG. 13 is a block diagram illustrating a second example of an exemplary configuration of an eNB to which the technology of the present disclosure may be applied. An eNB 830 includes one or more antennas 840, a base station apparatus 850 and an RRH 860. The RRH 860 may be connected with each of the antennas 840 via an RF cable. The base station device 850 and RRH 860 may be connected to each other via a high-speed line such as fiber cable.

Each of the antennas 840 includes one or more antenna' elements (such as multiple antenna elements included in a multiple-input multiple-output (MIMO) antenna), and is for the RRH 860 to transmit and receive a wireless signal. As illustrated in FIG. 13, the eNB 830 may include multiple antennas 840. For example, the multiple antennas 840 may be compatible with multiple frequency bands used by the eNB 830. Although the eNB 830 including multiple antennas 840 is illustrated in FIG. 13, the eN3 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 24.

The radio communication interface 855 supports any cellular communication solution (such as LTE and LTE-advanced), and provides wireless communication with a terminal located in a sector corresponding to the RRH 860 via the RRH 860 and the antenna 840. The radio communication interface 855 may generally include for example a BB processor 856. The BB processor 856 is the same as the BB processor 826 described with reference to FIG. 13, except that the BB processor 856 is connected to an RF circuit 864 of the RRH 860 via the connection interface 857. The radio communication interface 855 may include the multiple BB processors 856, as illustrated in FIG. 13. For example, the multiple BB processors 856 may be compatible with multiple frequency hands used by the eNB 830. Although an example in which the radio communication interface 855 includes multiple BB processors 856 is illustrated in FIG. 13, the radio communication interface 855 may include a single BB processor 856.

The connection interface 857 is an interface for connecting the base station device 850 (the radio communication interface 855) to the RRH 860. The connection interface 857 may be a communication module for connecting the base station device 850 (the radio communication interface 855) to a communication in the above high-speed line of the RRH 860.

The RRH 860 includes a connection interface 861 and a radio communication interface 863.

The connection interface 861 is an interface for connecting the RRH 860 (the radio communication interface 863) to the base station apparatus 850. The connection interface 861 may be a communication module for the communication in the above high-speed line.

The radio communication interface 863 transmits and receives a wireless signal via the antenna 840. The radio communication interface 863 may generally include for example the RF circuit 864. The RF circuit 864 may include for example frequency mixer, a filter and an amplifier, and transmits and receives a wireless signal via the antenna 840. The radio communication interface 863 may include multiple RF circuits 864, as illustrated in FIG. 13. For example, multiple RE circuits 864 may support multiple antenna elements. Although the example in which the radio communication interface 863 includes the multiple RE circuits 864 is illustrated in FIG. 13, the radio communication interface 863 may also include a single RF circuit 864.

In the eNB 800 illustrated in FIG. 13, the transceiving unit 103 described with reference to FIG. 3 and the transceiving unit 203 described with reference to FIG. 6 may be implemented by the radio communication interface 855 and/or the radio communication interface 863. At least a part of the functions may also be implemented by the controller 851. For example, the controller 851 may perform the determination of the adjacent network control terminal and CSI RS ports thereof producing the interference and the generation of the interference indication information by performing the functions of the first determining unit 101, the second determining unit 102, and the generating unit 104, and/or perform the generation of the first indication information and the determination of the interfering beam as well as the processing of the interferences by performing the functions of the acquiring unit 201, the generating unit 202, and the determining unit 204.

[Application Examples Regarding User Equipment]

First Application Example

Figure 14:
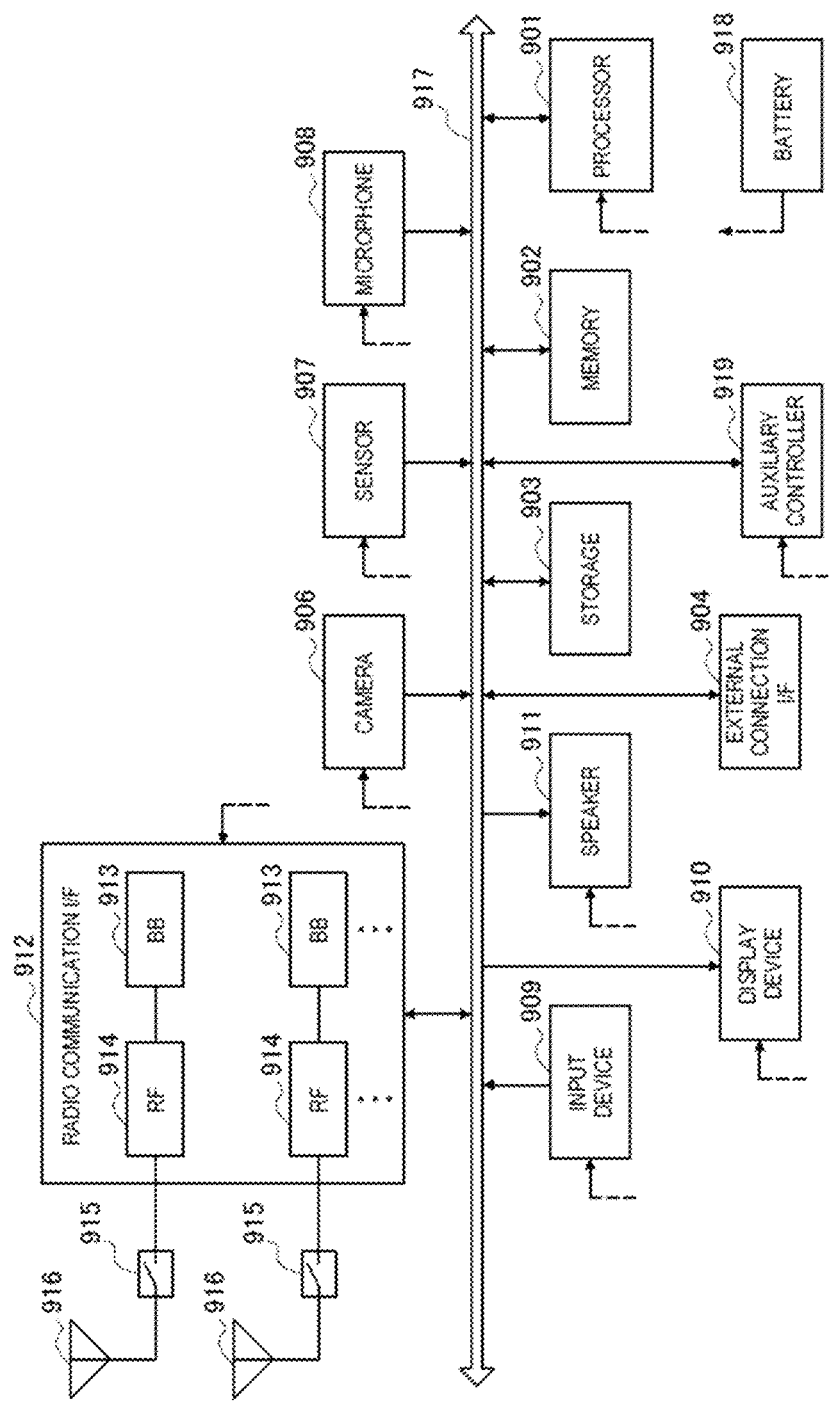
FIG. 14 is a block diagram illustrating an example of a schematic configuration of a smart phone to which the technology according to the present disclosure can be applied.

FIG. 14 is a block diagram illustrating an example of exemplary configuration of a smart phone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes RAM and ROM, and stores a program that is executed by the processor 901, and data. The memory device 903 may include a memory medium, such as a semiconductor memory and a hard disc. The external connection interface 904 is an interface configured to connect an external apparatus (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors such as a measurement sensor, a gyro sensor, a geomagnetic sensor, and an acceleration sensor. The microphone 908 converts sounds that are input to the smart phone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen (such as a liquid crystal display (LCD) and an organic light-emitting diode (OLED) display), and displays an output image of the smart phone 900. The speaker 911 converts the audio signal that is output from the smart phone 900 to sound.

The radio communication interface 912 supports any cellular communication scheme (such as LTE and LTE-Advanced), and performs wireless communication. The radio communication interface 912 may generally include for example a 1313 processor 913 and an RF circuit 914. The BB processor 913 may perform for example coding/decoding, modulation/demodulation and multiplexing/de-multiplexing, and perform various types of signal processes for radio communication. Meanwhile, the RF circuit 914 may include a mixer, a filter and an amplifier for example, and transmit and receive a radio signal via the antenna 916. It should be noted that although the figure shows a case where one RF link is connected to one antenna, which is only illustrative, a case where one RF link is connected to a plurality of antennas through a plurality of phase shifters is included. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 14. Although FIG. 14 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance radio communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Figure 16:
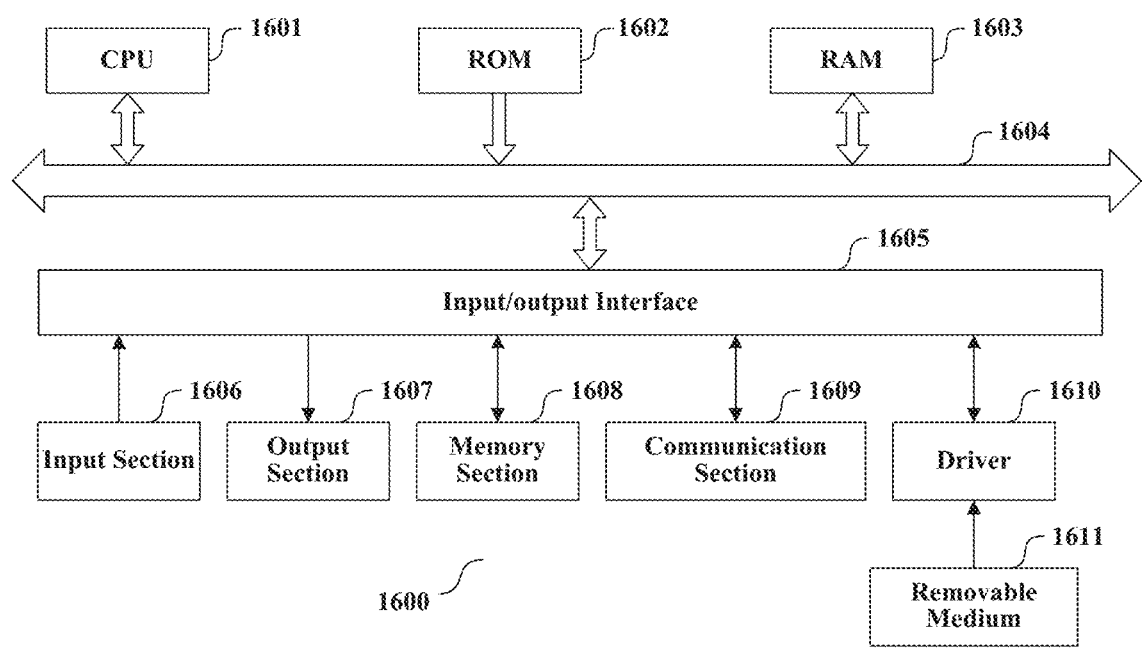
FIG. 16 is a block diagram of an exemplary block diagram illustrating the structure of a general purpose personal computer capable of realizing the method and/or device and/or system according to the embodiments of the present invention.

Each of the antennas 916 includes one or more antenna elements (such as multiple antenna elements included in an MIMO antenna), and is used for the radio communication interface 912 to transmit and receive radio signals. The smart phone 900 may include the multiple antennas 916, as illustrated in FIG. 14. Although FIG. 16 illustrates the example in which the smart phone 900 includes the multiple antennas 916, the smart phone 900 may also include a single antenna 916.

In addition, the smart phone 900 may include antenna 916 for each radio communication scheme. In that case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to the modules of the smart phone 900 shown in FIG. 14 via a feeder line. The feeder line is partially shown with a dash line in the figure. The auxiliary controller 919 operates a minimum necessary function of the smart phone 900, for example, in a sleep mode.

In the smart phone 900 shown in FIG. 14, the transceiving unit 304 described with reference to FIG. 7 may be implemented by the radio communication interface 912. At least a part of functions may be implemented by a processor 901 or an auxiliary controller 919. For example, the processor 901 or the auxiliary controller 919 may generate information indicating an interference status of the used. CSI RS ports and measure RSRP of CSI RS ports indicated by the first indication information of the adjacent base station by performing functions of the evaluating unit 301, the measuring unit 302, and the generating unit 303.

Second Application Example

Figure 15:
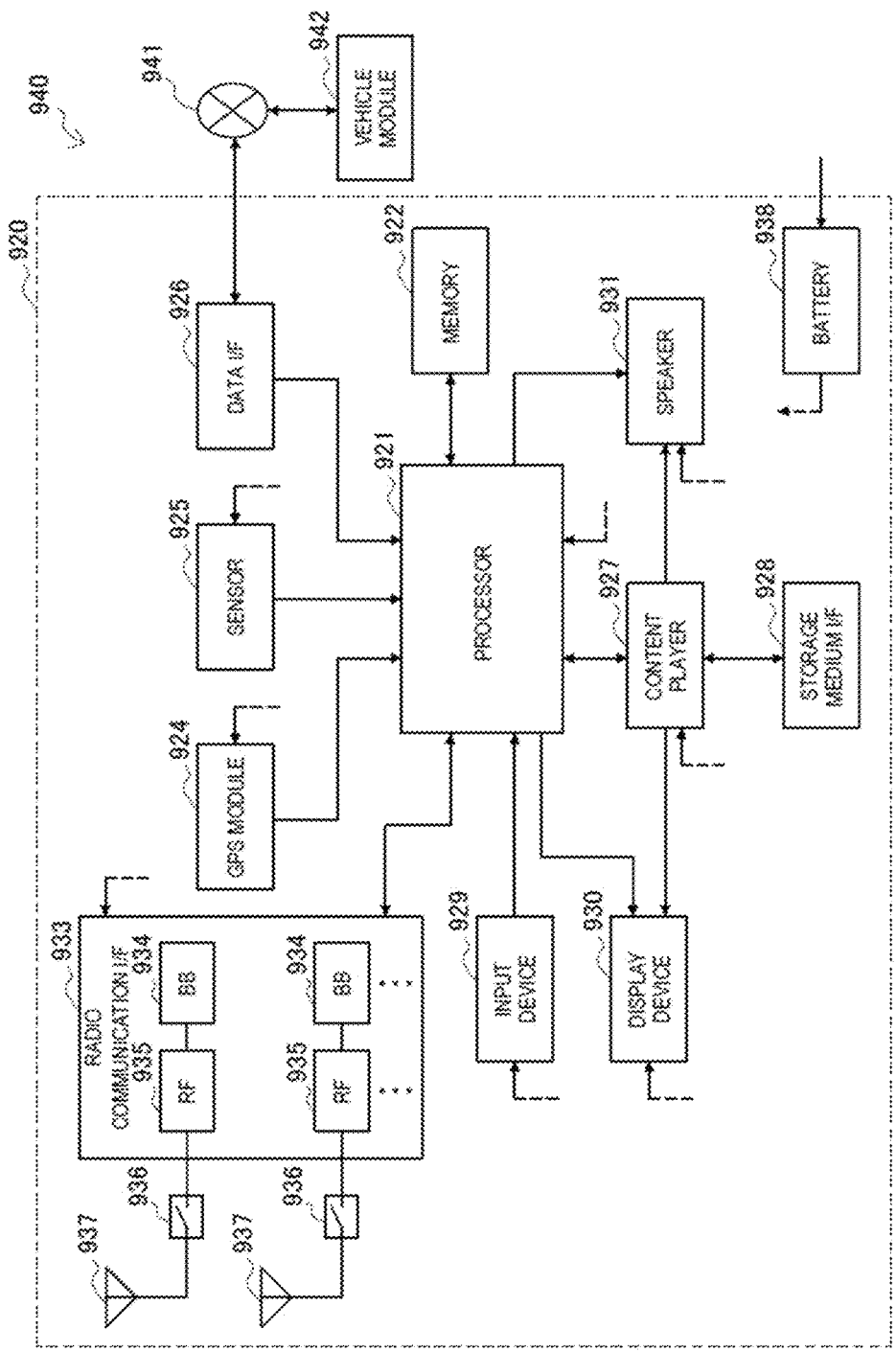
FIG. 15 is a block diagram illustrating an example of a schematic configuration of an car navigation device to which the technology of the present disclosure may be applied.

FIG. 15 is a block diagram showing an example of a schematic configuration of a car navigation device 920 to which the technique of the disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937 and a battery 938.

The processor 921 may be for example a CPU or a SoC, and controls a navigation function and additional function of the car navigation apparatus 920. The memory 922 includes RAM and ROM, and stores a program that is executed by the processor 921, and data.

The GPS module 924 measures a location (such as a latitude, a longitude and a height) of the automobile navigation device 920 using a GPS signal received from a GPS satellite. The sensor 925 may include a group of sensors such as a gyroscope sensor, a geomagnetic sensor and an air pressure sensor. The data interface 926 is connected to, for example, an in-vehicle network 941 via a terminal that is not shown, and acquires data generated by the vehicle, (such as vehicle speed data), The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may generally include for example a BB processor 934 and an RF circuit 935. The 1313 processor 934 may perform encoding/decoding, modulating/demodulating and multiplexing/demultiplexing for example, and perform various types of signal processing for wireless communication. The RF circuit 935 may include a mixer, a filter and an amplifier for example, and transmit and receive a radio signal via the antenna 937. The radio communication interface 933 may also be a chip module on which the BB processor 934 and the RF circuit 935 are integrated. The radio communication interface 933 may include multiple BB processors 934 and multiple RF circuits 935, as illustrated in FIG. 15. Although FIG. 15 illustrates an example in which the radio communication interface 933 includes multiple BB processors 934 and multiple RF circuits 935, the radio communication interface 933 may also include a single BB processor 934 and a single RF circuit 935.

In addition, in addition to a cellular communication scheme, the radio communication interface 933 may support another type of radio communication scheme such as a short-distance radio communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes one or more antenna elements (such as multiple antenna elements included in a MIMO antenna) and is used by the radio communication interface 933 to transmit and receive a radio signal. As shown in FIG. 15, the automobile navigation device 920 may include multiple antennas 937. Although FIG. 15 illustrates the example in which the car navigation apparatus 920 includes the multiple antennas 937, the car navigation apparatus 920 may also include a single antenna 937.

In addition, the car navigation apparatus 920 may include antenna 937 for each radio communication scheme. In this case, the antenna switch 936 may be omitted from the configuration of the car navigation apparatus 920.

The battery 938 supplies power to the blocks of the car navigation apparatus 920 shown in FIG. 15 via a feeder line. The feeder line is partially shown with a dash line in the figure. The battery 938 accumulates power supplied form the vehicle.

In the car navigation device 920 shown in FIG. 15, the transceiving unit 304 described with reference to FIG. 7 may be implemented by the radio communication interface 933. At least a part of functions may be implemented by the processor 921. For example, the processor 901 may generate information indicating an interference status of the used CSI RS ports and measure RSRP of CSI RS ports indicated by the first indication information of the adjacent base station by performing functions of the evaluating unit 301, the measuring unit 302, and the generating unit 303.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data (such as vehicle speed, engine speed, and trouble information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1600 shown in FIG. 16) from a storage medium or network, wherein the computer is capable of implementing various functions when installed with various programs.

In FIG. 16, a central processing unit (CPU) 1601 executes various processing according to a program stored in a read-only memory (ROM) 1602 or a program loaded to a random access memory (RAM) 1603 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605, if needed. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved through software, programs forming the software are installed from a network such as the Internet or a memory medium such as the removable medium 1611.

It should be appreciated by those skilled in the art that the memory medium is not limited to the removable medium 1611 shown in FIG. 16, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than imitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. electronic apparatus for a first network control terminal, comprising:
    a transceiver; and
    processing circuitry operatively connected to the transceiver, the processing circuitry configured to:
    receive indication information from a second network control terminal, the indication information indicating an interference status of a CSI RS port used by a second network node that is served by the second network control terminal;
    based on indication information, transmit to a first network node being served by the first network control terminal a request that the first network node measure a reference signal receiving power (RSRP) of at least one channel status information reference signal (CSI RS) port of the first network node;
    receive a RSRP measurement result from the first network node, the RSRP measurement report including a port number of a CSI RS port of the first network node having a RSRP above a second predetermined threshold: and
    based on the received RSRP measurement result, transmit interference indication information to the first network node, the interference indication information identifying a port number of the CSI RS port of the first network node having the RSRP above the second predetermined threshold.

2. The electronic apparatus according to claim 1, wherein the CSI RS port of the first network node having the RSRP above the second predetermined threshold is a CSI RS port having the highest RSRP among the at least one CSI RS port of the first network node.

3. The electronic apparatus according to claim 1, wherein the indication information indicates a CSI RS port of the second network node having a RSRP that is below a first predetermined threshold.

4. The electronic apparatus according to claim 3, wherein, the first predetermined threshold is set according to an emitting power of the first network control terminal.

5. The electronic apparatus according to claim 1, wherein. the processing circuitry is further configured to transmit modified interference indication information, in the case that updated indication information is not received from the second network control terminal within a first predetermined period of time after transmitting the interference indication information.

6. An electronic apparatus for a second network control terminal, comprising:
    a transceiver: and
    processing circuitry operatively connected to the transceiver, the processing circuitry configured to:
    acquire, from a second network node served by the second network control terminal, a measurement result of a reference signal receiving power (RSRP) measured by the second network node with respect to CSI RS ports used by the second network control terminal;
    based on the measurement result, transmit, to a first network control terminal, indication information indicating an interference status of a CSI RS port used by the second network node:
    receive interference indication information from the first network control terminal, the interference indication information identifying a port number of a CSI RS port of a first network node having a RSRP above a second predetermined threshold, the first network node being served by the first network control terminal:
    identify a beam of the second network control terminal that is interfering with the CSI RS port of the first network node having the RSRP above the second predetermined threshold; and
    change a characteristic of the identified beam.

7. The electronic apparatus according to claim 6, wherein, the processing circuitry is configured to generate the indication information, in the case that measurement results of more than or equal to a predetermined number of second network nodes served by the second network control terminal are consistent.

8. The electronic apparatus according to claim 6, wherein the processing circuitry is further configured to change the characteristic of the identified beam by one of: switching a CSI RS corresponding to the identified beam from a beamforming CSI RS to a non-precoded CSI RS, or multiplexing the identified beam with a beam of the first network control terminal in a time-division manner.

9. The electronic apparatus according to claim 8, wherein, the processing circuitry is further configured to perform the switching or time-division multiplexing, when more than or equal to a predetermined number of pieces of interference indication information with respect to the identified beam are received within a second predetermined period of time.

10. The electronic apparatus according to claim 8, wherein, the processing circuitry is further configured to switch the interfering-identified beam from the non-precoded CSI RS back to the beam-forming CSI RS, or stop multiplexing the beam, in response to receiving modified interference indication information from the first network control terminal the modified interference indication information corresponding to the case that updated indication information is not received by the first network control terminal from the second network control terminal within a first predetermined period of time after interference indication information is transmitted.

11. A method performed by an electronic apparatus for a first network control terminal, the method comprising:
    receiving indication information from a second network control terminal, the indication information indicating an interference status of a CSI RS port used by a second network node that is served by the second network control terminal;
    based on indication information, transmitting, to a first network node being served by the first network control terminal, a request that the first network node measure a reference signal receiving power (RSRP) of at least one channel status information reference signal (CSI RS) port of the first network node;
    receiving a RSRP measurement result from the first network node, the RSRP measurement report including a port number of a CSI RS port of the first network node having a RSRP above a second predetermined threshold; and
    based on the received RSRP measurement result, transmitting interference indication information to the first network node, the interference indication information identifying a port number of the CSI RS port of the first network node having the RSRP above the second predetermined threshold.

12. A method performed by an electronic apparatus for a second network control terminal, the method comprising:
    acquiring, from a second network node served by the second network control terminal, a measurement result of a reference signal receiving power (RSRP) measured by the second network node with respect to CSI RS ports used by the second network control terminal;
    based on the measurement result, transmitting, to a first network control terminal, indication information indicating an interference status of a. CSI RS port used by the second network node;
    receiving interference indication information from the first network control terminal, the interference indication information identifying a port number of a CSI RS port of a first network node having a RSRP above a second predetermined threshold, the first network node being served by the first network control terminal;
    identifying a beam of the second network control terminal that is interfering with the CSI RS port of the first network node having the RSRP above the second predetermined threshold; and
    changing a characteristic of the identified beam.

\* \* \* \* \*